United States Patent
Rodenhauser

(10) Patent No.: US 9,140,330 B2
(45) Date of Patent: Sep. 22, 2015

(54) PITCHED CABLE HAVING A FLEXIBLE CORE AROUND WHICH A COIL IS WRAPPED

(75) Inventor: Ernst Rodenhauser, Rossdorf (DE)

(73) Assignee: GEMO D. G. MORITZ GMBH & CO., Berlin (DE)

( * ) Notice: Subject to any disclaimer, the term of this patent is extended or adjusted under 35 U.S.C. 154(b) by 0 days.

(21) Appl. No.: 13/995,212

(22) PCT Filed: Oct. 26, 2011

(86) PCT No.: PCT/EP2011/005394
§ 371 (c)(1),
(2), (4) Date: Jul. 19, 2013

(87) PCT Pub. No.: WO2012/084082
PCT Pub. Date: Jun. 28, 2012

(65) Prior Publication Data
US 2013/0291665 A1   Nov. 7, 2013

(30) Foreign Application Priority Data
Dec. 23, 2010   (DE) .................. 10 2010 055 809

(51) Int. Cl.
*F16G 9/00* (2006.01)
*B60J 7/057* (2006.01)
*F16C 1/14* (2006.01)

(52) U.S. Cl.
CPC . *F16G 9/00* (2013.01); *B60J 7/057* (2013.01); *F16C 1/14* (2013.01); *Y10T 74/18832* (2015.01)

(58) Field of Classification Search
CPC ............ B60J 7/057; F16C 1/14; F16C 1/105; F16C 1/101; F16C 2226/74; F16G 9/00

USPC .............................................. 74/502.4, 502.6
See application file for complete search history.

(56) References Cited

U.S. PATENT DOCUMENTS 2,484,485 A    1/1945  Brickman
3,063,303 A *  11/1962 Cadwallader ................ 74/502.5
(Continued)

FOREIGN PATENT DOCUMENTS

DE    1819640 U  * 10/1960  .................. 74/502.4
DE    2912666 A1    4/1979
(Continued)

OTHER PUBLICATIONS

EPO Machine Translation of DE 3841460, Willibald et al., Jun. 1990.*
(Continued)

*Primary Examiner* — Vinh Luong
(74) *Attorney, Agent, or Firm* — Rankin, Hill & Clark LLP

(57) ABSTRACT

A pitched cable having a flexible core around which a coil is wrapped. The flexible core includes an end area which protrudes beyond the coil and passes through a hole of a carrier. The carrier bears at one end of the hole against an end of the coil, and at an other end of the hole against a stop body fastened to an end of the core. An end region of the coil is provided with a metal casting that encloses the coil and the core. Mutually abutting surfaces of the metal casting and of the carrier can be formed with a positive-locking engagement, which prevents relative twisting between the metal casting and the carrier about the core. The metal casting can be formed as a zinc die casting.

4 Claims, 1 Drawing Sheet

(56) References Cited

U.S. PATENT DOCUMENTS

| | | | |
|---|---|---|---|
| 4,038,881 A | | 8/1977 | Conrad |
| 4,334,438 A | * | 6/1982 | Mochida ........................ 74/502.4 |
| 5,020,850 A | * | 6/1991 | Bienert et al. ................. 296/223 |
| 5,211,500 A | * | 5/1993 | Takaki et al. .................. 403/269 |
| 5,829,314 A | * | 11/1998 | Scura ............................ 74/502.4 |
| 6,209,414 B1 | * | 4/2001 | Uneme ......................... 74/502.4 |
| 2003/0227196 A1 | * | 12/2003 | Langguth ................. 296/216.08 |
| 2013/0000427 A1 | * | 1/2013 | Stenzel ............................ 74/30 |

FOREIGN PATENT DOCUMENTS

| | | | | | |
|---|---|---|---|---|---|
| DE | 3135450 | A1 | * | 7/1983 | .............. B60J 7/057 |
| DE | 3428919 | A1 | * | 2/1986 | .............. B60J 7/057 |
| DE | 3841460 | A1 | * | 6/1990 | .............. F16H 25/20 |
| DE | 20111621 | U1 | | 10/2001 | |
| DE | 102 47 556 | A1 | * | 4/2004 | ................. B60J 7/00 |
| DE | 102006021650 | A1 | | 12/2007 | |

OTHER PUBLICATIONS

EPO Machine Translation of DE 3428919 A1, Maerz Helmut, Feb. 1986.*

EPO Machine Translation of DE 3135450 A1, Lutz Edgar, Jul. 1983.* dictionary.reference.com/browse/fasten?s=t; May 4, 2015.*

English translation of the International Preliminary Report on Patentability dated Jun. 26, 2013 in corresponding International Patent Application No. PCT/EP2011/005394, filed Oct. 26, 2011.

* cited by examiner

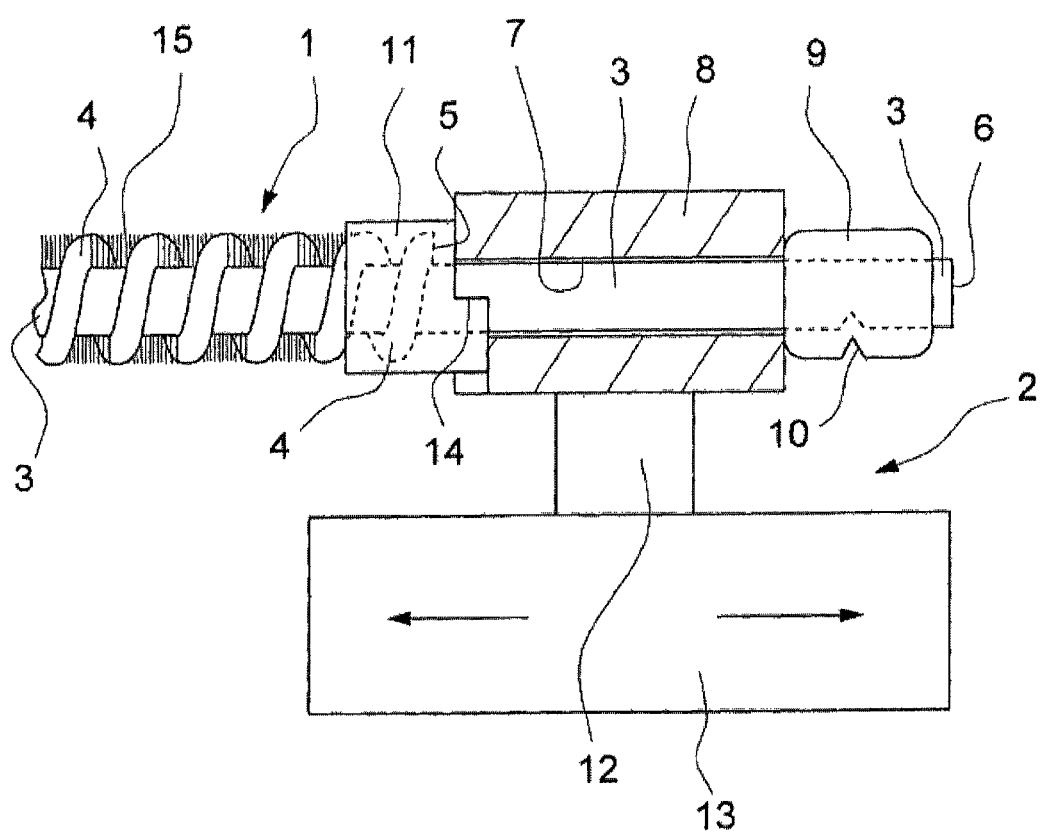

PITCHED CABLE HAVING A FLEXIBLE CORE AROUND WHICH A COIL IS WRAPPED

BACKGROUND OF THE INVENTION

The invention relates to a pitched cable having a flexible core around which a coil is wrapped. The core is usually constructed in multiple layers of wires wound in opposite directions. Around the core, a coil made of wire is wound with fixed compression. A carrier attached to an end is used for coupling an element to be driven, for example, the sliding roof of a motor vehicle.

By means of the pitched cable, considerable forces acting in the axial direction of the cable are transferred to the sliding roof; they can occur both during the opening and also during the closing of the sliding roof—that is, in both directions. For this purpose, the carrier is to be attached with appropriate loading capacity to the pitched cable.

In the known, commercially conventional constructions, the core protrudes at one end of the pitched cable from the coil, and, in this end area, it passes through a hole of the carrier. On one side of the carrier, the end of the coils bears against the carrier. And, a stop body attached to the core bears against the other end of the carrier. As a result, a supporting action that has no play in the two directions is ensured. The stop body can be fixed to the core very strongly; for example, it is formed from metal and clamped on the core.

In known constructions of this type, the carrier bears directly against the end of the coil. Although the latter is attached firmly by a very strong, plastically deforming winding on the core, the force at which the coil yields and is shifted in the axial direction on the core is in a range which, under difficult conditions, for example, in the case of a jammed sliding roof seal, still has to be transferred in order to move said sliding roof seal.

Attempts to attach the end of the coil to the core more firmly, for example, by plastic gluing, has not led to a sufficient increase in the strength. Soldering connections cannot be considered, due to the high heat exposure. When soldering over the typical time period of, for example, one minute, the temperatures that occur, namely 800-900° C., which are typically required for soldering, lead to thermal weakening of the materials of the pitched cable.

BRIEF SUMMARY OF THE INVENTION

The problem solved by the present invention relates to increasing the forces that can be transferred by the pitched cable to the carrier.

According to the invention, the free end area of the core is inserted through the hole of the carrier and provided at the protruding end with the stop body, which is clamped, for example. At the critical end of the coil, a metal casting enclosing said coil and the core is provided, which sits with a positive-locking connection on the coil and the core, and which transfers very high forces to the pitched cable, due to the high strength of the metal, a large portion of said forces being transferred directly to the core. In this construction, there is no longer any risk of dislocations of the end of the coil on the core occurring in the case of higher forces, as in the past.

It is preferable to provide a rotation-preventing positive-locking connection between the adjacent surfaces of the metal casting and of the carrier. As a result, an undesired turning of the carrier with respect to the pitched cable is thus prevented in a very simple manner.

It is advantageous to form the metal casting as a zinc die casting. Zinc die casting is characterized by a particularly low thermal load. The heat shock applied to the material of the pitched cable during zinc die casting is limited in duration to a few tenths of a second, at temperatures that are below the soldering temperatures previously mentioned.

Thus, in the case of a high structural strength of the metal casing, a low level of damage to the structural strength of the pitched cable is also ensured.

BRIEF DESCRIPTION OF THE DRAWING

In the drawing, the invention is represented as an example and diagrammatically in a single FIGURE, which shows, in a side view, the end area of a pitched cable with carrier.

DETAILED DESCRIPTION OF THE INVENTION

The accompanying FIGURE shows the end area of a pitched cable 1 with a carrier 2 attached to it.

The pitched cable 1 comprises a core 3 which consists of twisted wires. The core 3 has a coil 4 wrapped around it, the winding being very firm around the core 3, and thus capable of absorbing high forces in the axial direction of the core 3.

The coil 4 ends at 5—that is before the end 6 of the core 3. The end area of the core 3 located in between is uncovered.

This uncovered end area of the core 3 passes through a hole 7 in a hole portion 8 of the carrier 2. As shown in the drawing, the hole 7 extends from an entrance side of the carrier to an exit side of the carrier relative to an insertion direction of the core 3. At the end of the core 3, a stop body 9 is provided, which is attached to the core 3. In the represented embodiment example, the stop body 9 consists of a deformable metal and it is secured by impact to the notch 10 on the core 3. The stop body bears by means of a surface thereof against the end of the hole portion 8, while the other end of the hole portion 8 bears against the end 5 of the coil 4.

In order to prevent, in the case of high forces, a deformation of the uncovered end 5 of the coil 4 with respect to the core 3, the end area of the coil 4 is enclosed with a metal casting 11 produced by a zinc die casting. The material of the metal casting 11 encloses the end area of the coil 4 and the surface of the core 3 in a positive locking surface engagement. Very high actuation forces can thus be transferred by the metal casting 11 directly to the core 3. There is no risk of deformations of the end area of the coil 4.

The hole portion 8 of the carrier 2 is attached by a connecting bar 12 to a slider portion 13 of the carrier, which is to be moved in the direction of the arrow, that is in the direction of the axis of the pitched cable 1, in order to move, for example, a sliding roof that engages on the sliding portion 13.

Interfering twists of the carrier 2 about the axis of the pitched cable 1 can occur. To prevent this, a firm swivel coupling of the two parts is desirable.

For this purpose, the mutually abutting surfaces of the metal casting 11 and of the hole portion 8 of the carrier 2, as shown in the drawing FIGURE, are designed with a protrusion 14 so that they engage with each other in such a manner that a positive-locking swivel connection between the two parts is obtained.

In the mounting arrangement represented in the drawing FIGURE, the carrier 2 is firmly clamped by its hole portion 8 between the metal casting 11 and the connecting body 9.

The manufacture of the construction represented in the drawing FIGURE is very simple.

One starts with a pitched cable 1, delivered, for example, in a continuous form, in the represented embodiment, in which the usual noise-reducing flocculation 15 is provided between the windings of the coil 4. Then, the core 3 is cut off at the end 6, and, in the end area between the end 6 of the core and the end 5 of the coil 4, it is separated from said coil. Subsequently, in an embodiment that is not represented, zinc casting material is injected into the spatial area of the metal casting 11. Next, the carrier 2 with the hole 7 is slipped on, and then the connecting body 9 is slipped on, and clamped by impact on the notch at 10.

The carrier 2 can be varied in different manners depending on the application field. If needed, the positive-locking swivel engagement represented at 14 can be omitted, or, for example, it can also be formed between the hole portion 8 and the stop body 9.

The invention claimed is:

1. A pitched cable comprising a flexible core around which a coil is wrapped, the flexible core including an end area which protrudes beyond the coil and passes through a hole formed in a carrier, said hole extending from an entrance side of the carrier to an exit side of the carrier, wherein a stop body is fastened to the end area of the core and bears against the exit side of the carrier, wherein a metal casting enclosing an end region of the coil and a surface portion of the core is provided on the coil and the core with a positive-locking connection, and wherein said metal casting bears against the entrance side of the carrier thereby cooperating with the stop body to prevent movement of the carrier axially relative to the pitched cable.

2. The pitched cable according to claim 1, wherein mutually abutting surfaces of the metal casting and of the carrier each include a protrusion that engage with each other in such a manner that relative twisting between the metal casting and the carrier about the core is prevented.

3. The pitched cable according to claim 1, wherein the metal casting is formed as a zinc die casting.

4. The pitched cable according to claim 2, wherein the metal casting is formed as a zinc die casting.

* * * * *